US010668381B2

(12) United States Patent
Condrey et al.

(10) Patent No.: US 10,668,381 B2
(45) Date of Patent: Jun. 2, 2020

(54) SYSTEM AND METHOD FOR TRANSPARENTLY STYLING NON-PLAYER CHARACTERS IN A MULTIPLAYER VIDEO GAME

(71) Applicant: Activision Publishing, Inc., Santa Monica, CA (US)

(72) Inventors: Michael Condrey, San Carlos, CA (US); Mark Rubin, Encino, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 16/140,863

(22) Filed: Sep. 25, 2018

(65) Prior Publication Data

US 2019/0291007 A1    Sep. 26, 2019

Related U.S. Application Data

(63) Continuation of application No. 14/572,240, filed on Dec. 16, 2014, now Pat. No. 10,118,099.

(51) Int. Cl.
*A63F 13/00* (2014.01)
*A63F 13/60* (2014.01)
(Continued)

(52) U.S. Cl.
CPC .............. *A63F 13/60* (2014.09); *A63F 13/48* (2014.09); *A63F 13/795* (2014.09); *A63F 2300/5553* (2013.01)

(58) Field of Classification Search
None
See application file for complete search history.

(56) References Cited

U.S. PATENT DOCUMENTS

| 4,461,301 A | 7/1984 | Ochs |
| 4,908,761 A | 3/1990 | Tai |

(Continued)

FOREIGN PATENT DOCUMENTS

| AU | 768367 | 3/2004 |
| AU | 2005215048 | 10/2011 |

(Continued)

OTHER PUBLICATIONS

Ma et al., "A Scalable Parallel Cell-Projection Volume Rendering Algorithm for Three-Dimensional Unstructured Data", IEEE 1997, pp. 1-10.

(Continued)

*Primary Examiner* — Paul A D'Agostino
(74) *Attorney, Agent, or Firm* — Novel IP

(57) ABSTRACT

A system and method are provided for transparently styling non-player characters ("NPCs") in multiplayer video games such that it is difficult to distinguish between human players and computer-controlled NPCs. NPCs may be styled to resemble human players in terms of both player profile attributes and gameplay actions such that players may not recognize NPCs as non-human, computer-controlled players. Additionally, or alternatively, NPCs and/or human players may be presented with a limited set of profile attributes that may reduce or eliminate the ability to distinguish between human players and NPCs, one or more profile attributes may be "anonymized," and/or the ability to view player profiles of human players and/or NPCs may be disabled altogether. In certain gameplay sessions including real and/or practice gameplay sessions, human players may be prompted to select from among a predetermined set of playable characters having predefined profile attributes.

21 Claims, 3 Drawing Sheets

(51) Int. Cl.
  *A63F 13/795* (2014.01)
  *A63F 13/48* (2014.01)

(56) References Cited

U.S. PATENT DOCUMENTS

| | | |
|---|---|---|
| 5,031,089 A | 7/1991 | Liu |
| 5,058,180 A | 10/1991 | Khan |
| 5,365,360 A | 11/1994 | Torres |
| 5,371,673 A | 12/1994 | Fan |
| 5,432,934 A | 7/1995 | Levin |
| 5,442,569 A | 8/1995 | Osano |
| 5,493,692 A | 2/1996 | Theimer |
| 5,497,186 A | 3/1996 | Kawasaki |
| 5,530,796 A | 6/1996 | Wang |
| 5,539,883 A | 7/1996 | Allon |
| 5,561,736 A | 10/1996 | Moore |
| 5,563,946 A | 10/1996 | Cooper |
| 5,606,702 A | 2/1997 | Diel |
| 5,630,129 A | 5/1997 | Wheat |
| 5,685,775 A | 11/1997 | Bakoglu |
| 5,694,616 A | 12/1997 | Johnson |
| 5,706,507 A | 1/1998 | Schloss |
| 5,708,764 A | 1/1998 | Borrel |
| 5,726,883 A | 3/1998 | Levine |
| 5,736,985 A | 4/1998 | Lection |
| 5,736,990 A | 4/1998 | Barrus |
| 5,737,416 A | 4/1998 | Cooper |
| 5,745,113 A | 4/1998 | Jordan |
| 5,745,678 A | 4/1998 | Herzberg |
| 5,758,079 A | 5/1998 | Ludwig |
| 5,761,083 A | 6/1998 | Brown |
| 5,762,552 A | 6/1998 | Vuong |
| 5,768,511 A | 6/1998 | Galvin |
| 5,774,668 A | 6/1998 | Choquier |
| 5,793,365 A | 8/1998 | Tang |
| 5,825,877 A | 10/1998 | Dan |
| 5,828,839 A | 10/1998 | Moncreiff |
| 5,835,692 A | 11/1998 | Cragun |
| 5,860,137 A | 1/1999 | Raz |
| 5,877,763 A | 3/1999 | Berry |
| 5,878,233 A | 3/1999 | Schloss |
| 5,880,731 A | 3/1999 | Liles |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,920,692 A | 7/1999 | Nguyen |
| 5,920,848 A | 7/1999 | Schutzer |
| 5,923,324 A | 7/1999 | Berry |
| 5,926,100 A | 7/1999 | Escolar |
| 5,933,818 A | 8/1999 | Kasravi |
| 5,938,722 A | 8/1999 | Johnson |
| 5,958,014 A | 9/1999 | Cave |
| 5,969,724 A | 10/1999 | Berry |
| 5,977,979 A | 11/1999 | Clough |
| 5,983,003 A | 11/1999 | Lection |
| 5,990,887 A | 11/1999 | Redpath |
| 5,990,888 A | 11/1999 | Blades |
| 6,006,223 A | 12/1999 | Agrawal |
| 6,008,848 A | 12/1999 | Tiwari |
| 6,009,455 A | 12/1999 | Doyle |
| 6,012,096 A | 1/2000 | Link |
| 6,014,145 A | 1/2000 | Bardon |
| 6,018,734 A | 1/2000 | Zhang |
| 6,021,268 A | 2/2000 | Johnson |
| 6,021,496 A | 2/2000 | Dutcher |
| 6,023,729 A | 2/2000 | Samuel |
| 6,025,839 A | 2/2000 | Schell |
| 6,032,129 A | 2/2000 | Greef |
| 6,049,819 A | 4/2000 | Buckle |
| 6,058,266 A | 5/2000 | Megiddo |
| 6,059,842 A | 5/2000 | Dumarot |
| 6,061,722 A | 5/2000 | Lipa |
| 6,067,355 A | 5/2000 | Lim |
| 6,069,632 A | 5/2000 | Mullaly |
| 6,070,143 A | 5/2000 | Barney |
| 6,076,093 A | 6/2000 | Pickering |
| 6,081,270 A | 6/2000 | Berry |
| 6,081,271 A | 6/2000 | Bardon |
| 6,088,727 A | 7/2000 | Hosokawa |
| 6,088,732 A | 7/2000 | Smith |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,108,420 A | 8/2000 | Larose |
| 6,111,581 A | 8/2000 | Berry |
| 6,115,718 A | 9/2000 | Huberman |
| 6,134,588 A | 10/2000 | Guenthner |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,157,953 A | 12/2000 | Chang |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,212,548 B1 | 4/2001 | Desimone |
| 6,216,098 B1 | 4/2001 | Clancey |
| 6,222,551 B1 | 4/2001 | Schneider |
| 6,226,686 B1 | 5/2001 | Rothschild |
| 6,233,583 B1 | 5/2001 | Hoth |
| 6,249,779 B1 | 6/2001 | Hitt |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,293,865 B1 | 9/2001 | Kelly |
| 6,301,609 B1 | 10/2001 | Aravamudan et al. |
| 6,308,208 B1 | 10/2001 | Jung |
| 6,311,206 B1 | 10/2001 | Malkin |
| 6,314,465 B1 | 11/2001 | Paul |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,360,254 B1 | 3/2002 | Linden |
| 6,363,174 B1 | 3/2002 | Lu |
| 6,370,560 B1 | 4/2002 | Robertazzi |
| 6,396,513 B1 | 5/2002 | Helfman |
| 6,411,312 B1 | 6/2002 | Sheppard |
| 6,418,424 B1 | 7/2002 | Hoffberg |
| 6,418,462 B1 | 7/2002 | Xu |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,463,078 B1 | 10/2002 | Engstrom |
| 6,466,550 B1 | 10/2002 | Foster |
| 6,469,712 B1 | 10/2002 | Hilpert, Jr. |
| 6,473,085 B1 | 10/2002 | Brock |
| 6,473,103 B1 | 10/2002 | Bailey |
| 6,473,597 B1 | 10/2002 | Johnson |
| 6,476,830 B1 | 11/2002 | Farmer |
| 6,499,053 B1 | 12/2002 | Marquette |
| 6,501,834 B1 | 12/2002 | Milewski |
| 6,505,208 B1 | 1/2003 | Kanevsky |

(56) References Cited

U.S. PATENT DOCUMENTS

| | | |
|---|---|---|
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,559,863 B1 | 5/2003 | Megiddo |
| 6,567,109 B1 | 5/2003 | Todd |
| 6,567,813 B1 | 5/2003 | Zhu |
| 6,574,477 B1 | 6/2003 | Rathunde |
| 6,580,981 B1 | 6/2003 | Masood |
| 6,594,673 B1 | 7/2003 | Smith |
| 6,601,084 B1 | 7/2003 | Bhaskaran |
| 6,618,751 B1 | 9/2003 | Challenger |
| 6,640,230 B1 | 10/2003 | Alexander |
| 6,641,481 B1 | 11/2003 | Mai |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,742,032 B1 | 5/2004 | Castellani |
| 6,765,596 B2 | 7/2004 | Lection |
| 6,781,607 B1 | 8/2004 | Benham |
| 6,801,930 B1 | 10/2004 | Dionne |
| 6,807,562 B1 | 10/2004 | Pennock |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,854,007 B1 | 2/2005 | Hammond |
| 6,886,026 B1 | 4/2005 | Hanson |
| 6,901,379 B1 | 5/2005 | Balter |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,993,596 B2 | 1/2006 | Hinton |
| 7,006,616 B1 | 2/2006 | Christofferson |
| 7,028,296 B2 | 4/2006 | Irfan |
| 7,031,473 B2 | 4/2006 | Morais |
| 7,050,868 B1 | 5/2006 | Graepel |
| 7,062,533 B2 | 6/2006 | Brown |
| 7,089,266 B2 | 8/2006 | Stolte |
| 7,124,071 B2 | 10/2006 | Rich |
| 7,124,164 B1 | 10/2006 | Chemtob |
| 7,139,792 B1 | 11/2006 | Mishra |
| 7,143,409 B2 | 11/2006 | Herrero |
| 7,159,217 B2 | 1/2007 | Pulsipher |
| 7,185,067 B1 | 2/2007 | Viswanath |
| 7,192,352 B2 | 3/2007 | Walker |
| 7,209,137 B2 | 4/2007 | Brokenshire |
| 7,230,616 B2 | 6/2007 | Taubin |
| 7,240,093 B1 | 7/2007 | Danieli |
| 7,249,123 B2 | 7/2007 | Elder |
| 7,263,511 B2 | 8/2007 | Bodin |
| 7,278,108 B2 | 10/2007 | Duarte |
| 7,287,053 B2 | 10/2007 | Bodin |
| 7,292,870 B2 | 11/2007 | Heredia |
| 7,305,438 B2 | 12/2007 | Christensen |
| 7,308,476 B2 | 12/2007 | Mannaru |
| 7,314,411 B2 | 1/2008 | Lannert |
| 7,328,242 B1 | 2/2008 | McCarthy |
| 7,353,295 B1 | 4/2008 | Crow |
| 7,376,474 B2 | 5/2008 | Graepel |
| 7,383,307 B2 | 6/2008 | Kirkland |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,180 B2 | 12/2008 | Kaufman |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,509,388 B2 | 3/2009 | Allen |
| 7,515,136 B1 | 4/2009 | Kanevsky |
| 7,525,964 B2 | 4/2009 | Astley |
| 7,527,191 B2 | 5/2009 | Takayama |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,590,984 B2 | 9/2009 | Kaufman |
| 7,596,596 B2 | 9/2009 | Chen |
| 7,614,955 B2 | 11/2009 | Farnham |
| 7,617,283 B2 | 11/2009 | Aaron |
| 7,640,587 B2 | 12/2009 | Fox |
| 7,667,701 B2 | 2/2010 | Leah |
| 7,677,970 B2 | 3/2010 | O'Kelley, II |
| 7,698,656 B2 | 4/2010 | Srivastava |
| 7,702,730 B2 | 4/2010 | Spataro |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,770,114 B2 | 8/2010 | Sriprakash |
| 7,773,087 B2 | 8/2010 | Fowler |
| 7,774,407 B2 | 8/2010 | Daly |
| 7,780,525 B2 | 8/2010 | Walker |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,844,673 B2 | 11/2010 | Bostick |
| 7,846,024 B2 | 12/2010 | Graepel |
| 7,847,799 B2 | 12/2010 | Taubin |
| 7,853,594 B2 | 12/2010 | Elder |
| 7,856,469 B2 | 12/2010 | Chen |
| 7,865,393 B2 | 1/2011 | Leason |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,955,171 B2 | 6/2011 | Jorasch |
| 7,970,837 B2 | 6/2011 | Lyle |
| 7,970,840 B2 | 6/2011 | Cannon |
| 7,985,132 B2 | 7/2011 | Walker |
| 7,985,138 B2 | 7/2011 | Acharya |
| 7,990,387 B2 | 8/2011 | Hamilton, II |
| 7,996,164 B2 | 8/2011 | Hamilton, II |
| 7,997,987 B2 | 8/2011 | Johnson |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |

(56) References Cited

U.S. PATENT DOCUMENTS

| | | |
|---|---|---|
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,489,925 B1 | 7/2013 | Antukh |
| 8,496,531 B2 | 7/2013 | Youm |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,696,465 B2 | 4/2014 | Gatto |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,795,887 B2 | 10/2017 | Lin |
| 9,808,722 B2 | 11/2017 | Kawachiya |
| 9,827,488 B2 | 11/2017 | Pearce |
| 9,942,013 B2 | 4/2018 | Malladi |
| 2001/0032240 A1 | 10/2001 | Malone |
| 2001/0049301 A1* | 12/2001 | Masuda ............ A63F 13/10 463/33 |
| 2002/0002514 A1 | 1/2002 | Kamachi |
| 2002/0007319 A1 | 1/2002 | Yu |
| 2002/0026388 A1 | 2/2002 | Roebuck |
| 2002/0035480 A1 | 3/2002 | Gordon |
| 2002/0035593 A1 | 3/2002 | Salim |
| 2002/0043568 A1 | 4/2002 | Hess |
| 2002/0065870 A1 | 5/2002 | Baehr-Jones |
| 2002/0095586 A1 | 7/2002 | Doyle |
| 2002/0096831 A1 | 7/2002 | Nakayama |
| 2002/0097856 A1 | 7/2002 | Wullert |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0169665 A1 | 11/2002 | Hughes |
| 2002/0184373 A1 | 12/2002 | Maes |
| 2002/0184391 A1 | 12/2002 | Phillips |
| 2002/0188688 A1 | 12/2002 | Bice |
| 2003/0008712 A1 | 1/2003 | Poulin |
| 2003/0014297 A1 | 1/2003 | Kaufman |
| 2003/0032476 A1 | 2/2003 | Walker |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0076353 A1 | 4/2003 | Blackstock |
| 2003/0101343 A1 | 5/2003 | Eaton |
| 2003/0112952 A1 | 6/2003 | Brown |
| 2003/0135621 A1 | 7/2003 | Romagnoli |
| 2003/0141977 A1 | 7/2003 | Brown |
| 2003/0145128 A1 | 7/2003 | Baird |
| 2003/0149675 A1 | 8/2003 | Ansari |
| 2003/0158827 A1 | 8/2003 | Ansari |

(56) References Cited

U.S. PATENT DOCUMENTS

| | | |
|---|---|---|
| 2003/0177187 A1 | 9/2003 | Levine |
| 2003/0195957 A1 | 10/2003 | Banginwar |
| 2003/0210265 A1 | 11/2003 | Haimberg |
| 2004/0014514 A1 | 1/2004 | Yacenda |
| 2004/0054667 A1 | 3/2004 | Kake |
| 2004/0059781 A1 | 3/2004 | Yoakum |
| 2004/0078432 A1 | 4/2004 | Manber |
| 2004/0078596 A1 | 4/2004 | Kent |
| 2004/0088303 A1 | 5/2004 | Elder |
| 2004/0097287 A1 | 5/2004 | Postrel |
| 2004/0103079 A1 | 5/2004 | Tokusho |
| 2004/0113756 A1 | 6/2004 | Mollenkopf |
| 2004/0127277 A1 | 7/2004 | Walker |
| 2004/0128181 A1 | 7/2004 | Zurko |
| 2004/0172339 A1 | 9/2004 | Snelgrove |
| 2004/0174392 A1 | 9/2004 | Bjoernsen |
| 2004/0186886 A1 | 9/2004 | Galli et al. |
| 2004/0205134 A1 | 10/2004 | Digate |
| 2004/0210627 A1 | 10/2004 | Kroening |
| 2004/0228291 A1 | 11/2004 | Huslak |
| 2004/0244006 A1 | 12/2004 | Kaufman |
| 2004/0260771 A1 | 12/2004 | Gusler et al. |
| 2005/0015571 A1 | 1/2005 | Kaufman |
| 2005/0021484 A1 | 1/2005 | Bodin |
| 2005/0027696 A1 | 2/2005 | Swaminathan |
| 2005/0043097 A1* | 2/2005 | March ............... A63F 13/12 463/42 |
| 2005/0050137 A1 | 3/2005 | Bodin |
| 2005/0060368 A1 | 3/2005 | Wang |
| 2005/0071428 A1 | 3/2005 | Khakoo |
| 2005/0071462 A1 | 3/2005 | Bodin |
| 2005/0080859 A1 | 4/2005 | Lake |
| 2005/0085296 A1* | 4/2005 | Gelb ............... A63F 13/12 463/31 |
| 2005/0091380 A1 | 4/2005 | Gonen |
| 2005/0097440 A1 | 5/2005 | Lusk |
| 2005/0113164 A1 | 5/2005 | Buecheler |
| 2005/0132009 A1 | 6/2005 | Solie |
| 2005/0138108 A1 | 6/2005 | Galvin |
| 2005/0149620 A1 | 7/2005 | Kirkland |
| 2005/0161878 A1 | 7/2005 | Nally |
| 2005/0165893 A1 | 7/2005 | Feinberg |
| 2005/0216346 A1 | 9/2005 | Kusumoto |
| 2005/0223075 A1 | 10/2005 | Swearingen et al. |
| 2005/0246711 A1 | 11/2005 | Berstis |
| 2005/0277472 A1 | 12/2005 | Gillan |
| 2006/0003305 A1 | 1/2006 | Kelmar |
| 2006/0004659 A1 | 1/2006 | Hutchison |
| 2006/0026253 A1 | 2/2006 | Kessen |
| 2006/0031322 A1 | 2/2006 | Kessen |
| 2006/0031326 A1 | 2/2006 | Ovenden |
| 2006/0036688 A1 | 2/2006 | McMahan |
| 2006/0121990 A1 | 6/2006 | O'Kelley |
| 2006/0128460 A1 | 6/2006 | Muir |
| 2006/0129643 A1 | 6/2006 | Nielson |
| 2006/0155813 A1 | 7/2006 | Dietz et al. |
| 2006/0161852 A1 | 7/2006 | Chen |
| 2006/0178968 A1 | 8/2006 | Jung |
| 2006/0184260 A1 | 8/2006 | Graepel |
| 2006/0190591 A1 | 8/2006 | Bobde |
| 2006/0252526 A1 | 11/2006 | Walker |
| 2006/0258463 A1 | 11/2006 | Cugno |
| 2007/0026934 A1 | 2/2007 | Herbrich |
| 2007/0066403 A1 | 3/2007 | Conkwright |
| 2007/0073582 A1 | 3/2007 | Jung |
| 2007/0087799 A1* | 4/2007 | Van Luchene ........ A63F 13/847 463/1 |
| 2007/0106526 A1 | 5/2007 | Jung |
| 2007/0111789 A1 | 5/2007 | van Deursen |
| 2007/0112624 A1 | 5/2007 | Jung |
| 2007/0112706 A1 | 5/2007 | Herbrich |
| 2007/0117623 A1 | 5/2007 | Nelson |
| 2007/0117636 A1* | 5/2007 | Takahashi ............... A63F 13/10 463/43 |
| 2007/0130001 A1 | 6/2007 | Jung |
| 2007/0168444 A1 | 7/2007 | Chen |
| 2007/0168447 A1 | 7/2007 | Chen |
| 2007/0173323 A1 | 7/2007 | Johnson |
| 2007/0180040 A1 | 8/2007 | Etgen |
| 2007/0218997 A1* | 9/2007 | Cho ............... A63F 13/12 463/42 |
| 2007/0265718 A1 | 11/2007 | Graepel |
| 2007/0281285 A1 | 12/2007 | Jayaweera |
| 2007/0298867 A1 | 12/2007 | Huang |
| 2008/0019353 A1 | 1/2008 | Foote |
| 2008/0059304 A1 | 3/2008 | Kimsey |
| 2008/0064467 A1 | 3/2008 | Reiner |
| 2008/0113815 A1 | 5/2008 | Weingardt |
| 2008/0120558 A1* | 5/2008 | Nathan ............... A63F 13/12 715/764 |
| 2008/0126350 A1 | 5/2008 | Shoemaker |
| 2008/0155019 A1 | 6/2008 | Wallace |
| 2008/0176655 A1 | 7/2008 | James |
| 2008/0207329 A1 | 8/2008 | Wallace |
| 2008/0214287 A1 | 9/2008 | Lutnick |
| 2008/0242420 A1 | 10/2008 | Graepel |
| 2008/0254893 A1 | 10/2008 | Patel |
| 2008/0268943 A1 | 10/2008 | Jacob |
| 2008/0270605 A1 | 10/2008 | Berstis |
| 2008/0270916 A1 | 10/2008 | Chen |
| 2008/0301405 A1 | 12/2008 | Kaufman |
| 2009/0005172 A1 | 1/2009 | Shibahara |
| 2009/0075738 A1 | 3/2009 | Pearce |
| 2009/0113448 A1 | 4/2009 | Smith |
| 2009/0137320 A1 | 5/2009 | Kimura |
| 2009/0209335 A1* | 8/2009 | Pearce ............... G06Q 10/10 463/30 |
| 2009/0253494 A1 | 10/2009 | Fitch |
| 2009/0280909 A1* | 11/2009 | McEniry ............... A63F 13/12 463/42 |
| 2009/0325711 A1 | 12/2009 | Bronstein |
| 2010/0131864 A1* | 5/2010 | Bokor ............... A63F 13/12 715/757 |
| 2010/0169800 A1* | 7/2010 | Lance ............... A63F 13/79 715/757 |
| 2010/0173701 A1* | 7/2010 | Van Luchene ........ A63F 13/12 463/29 |
| 2010/0173713 A1* | 7/2010 | Van Luchene ........ A63F 13/12 463/42 |
| 2010/0192173 A1* | 7/2010 | Mizuki ............... A63F 13/12 725/25 |
| 2010/0267450 A1* | 10/2010 | McMain ............... A63F 13/56 463/30 |
| 2010/0304839 A1 | 12/2010 | Johnson |
| 2010/0306672 A1 | 12/2010 | McEniry |
| 2011/0190063 A1 | 8/2011 | Kajii |
| 2012/0010734 A1 | 1/2012 | Youm |
| 2012/0021825 A1 | 1/2012 | Harp |
| 2012/0122552 A1 | 5/2012 | Youm |
| 2012/0190456 A1* | 7/2012 | Rogers ............... G06Q 10/00 463/42 |
| 2013/0252737 A1 | 9/2013 | Mescon |
| 2013/0260876 A1* | 10/2013 | Margalith ............... A63F 13/85 463/29 |
| 2013/0266927 A1* | 10/2013 | Mann ............... A63F 13/005 434/362 |
| 2013/0296046 A1 | 11/2013 | Mianji |
| 2014/0004955 A1 | 1/2014 | Nahari |
| 2014/0004960 A1 | 1/2014 | Soti |
| 2014/0011595 A1 | 1/2014 | Muller |
| 2014/0162763 A1 | 6/2014 | Kim |
| 2014/0162781 A1 | 6/2014 | Butler |
| 2014/0274402 A1 | 9/2014 | Michel |
| 2014/0342808 A1* | 11/2014 | Chowdhary ............... A63F 13/63 463/24 |
| 2014/0344725 A1 | 11/2014 | Bates |
| 2014/0349753 A1 | 11/2014 | Imai |
| 2015/0038233 A1 | 2/2015 | Rom |
| 2015/0051000 A1* | 2/2015 | Henn ............... A63F 13/35 463/42 |
| 2015/0310698 A1 | 10/2015 | Polis |
| 2016/0001181 A1 | 1/2016 | Marr |
| 2016/0001182 A1 | 1/2016 | Marr |

(56) References Cited

U.S. PATENT DOCUMENTS

| | | |
|---|---|---|
| 2016/0001186 A1 | 1/2016 | Marr |
| 2016/0005270 A1 | 1/2016 | Marr |
| 2016/0067611 A1 | 3/2016 | Ware |
| 2016/0067612 A1 | 3/2016 | Ntoulas |
| 2016/0191671 A1 | 6/2016 | Dawson |
| 2016/0296840 A1 | 10/2016 | Kaewell |
| 2018/0169515 A1 | 6/2018 | Rice |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 1209849 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 2001230883 A | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004062539 A | 2/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5550720 B2 | 7/2014 |
| JP | 2015002839 A | 1/2015 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| WO | 0060444 A1 | 10/2000 |
| WO | 0062231 A1 | 10/2000 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03044755 A1 | 5/2003 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Hassen et al., "A Task-and Data-Parallel Programming Language Based on Shared Objects," ACM Transactions on Programming Languages and Systems, vol. 20, No. 6, Nov. 1998, pp. 1131-1170.

Y. Zhao et al., "A 3D virtual shopping mall that has the intelligent virtual purchasing guider and cooperative purchasing functionalities", CSCWD 2004—8th International Conference on Computer Supported Cooperative Work in Design—Proceedings, 2004, p. 381-385.

V. Stojanovic, "Virtual boutique-try clothes on-line", 5th International Conference on Telecommunications in Modern Satellite, Cable and Broadcasting Service. TELSIKS 2001. Proceedings of Papers (Cat. No. 01EX517), 2001, pt. 2, p. 802-3 vol. 2.

Kautz, H., B. Selman, M. Shah.. "Referral Web: Combining Social Networks and Collaborative Filtering". Communications of the ACM, vol. 40, No. 3, Mar. 1997.

Schwartz, M. F., D. C. M. Wood. "Discovering shared interests among people using graph analysis of global electronic mail traffic". Department of Computer Science, University of Colorado, Boulder CO. Oct. 1992.

Wellman, B. "For a social network analysis of computer networks: a sociological perspective on collaborative work and virtual community". Proceedings of the 1996 conference on ACM SIGCPR/SIGMIS. 1-11.

Qureshi, S. "Supporting electronic group processes: a social perspective". Proceedings of the 1995 ACM SIGCPR Conference on Supporting teams, groups, and learning inside the IS function. ACM Press. 24-34.

Ackerman, M.S., B. Starr. "Social activity indicators: interface components for CSCW systems". Proceedings of the 8th ACM Symposium on User Interface and Software Technology. ACM Press. 159-168, Nov. 14-17, 1995.

Garton, L., C. Haythornthwaite, B. Wellman. "Studying on-line social networks in Doing Internet Research", Jun. 1997.

Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.

Wang, Y. "Web Mining and Knowledge Discovery of Usage Patterns". CS748T Project (Part I) Feb. 2000.

Sack, W. "Conversation Map: a content-based Usenet newsgroup browser". Proceedings of the 2000 International Conference on Intelligent User Interfaces. ACM Press. 233-240.

Feldman, R. "Mining unstructured data". Tutorial notes for ACK SIGKDD 1999. ACM Press. 182-236.

(56) References Cited

OTHER PUBLICATIONS

Supplementary European Search from the European Patent Office for EP05723458.5, dated Jul. 19, 2010.
International Search Report as Published as WO2005/079538 in corresponding international application No. PCT/US2005/005550, dated Jul. 5, 2006.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Office Action dated Oct. 19, 2017 for U.S. Appl. No. 14/712,514; (pp. 1-12).
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
Lee et al., "A Self-Adjusting Data Distribution Mechanism for Multidimensional Load Balancing in Multiprocessor-Based Database Systems," Information Systems vol. 19, No. 7, pp. 549-567, 1994.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Andert, "A Simulation of Dynamic Task Allocation in a Distributed Computer System," Proceedings of the 1987 Winter Simulation Conference, 1987, pp. 1-9.
Roaming Virtual World Is a Real Trip; [Final Edition] Leslie Walker. The Washington Post. Washington, D.C.: Mar. 30, 2006.
E-Entrepreneurship: Learning in a Simulated Environment Salim Jiwa, Dawn Lavelle, Arjun Rose. Journal of Electronic Commerce in Organizations. Hershey: Jul.-Sep. 2005. vol. 3, Iss. 3.
"Universally Unique Identifier", 2006 (http://en.wikipedia.org/wiki/UUID).
K. Loesing et al., "Privacy-aware presence management in instant messaging systems", Distributed & Mobile Syst. Group, Otto-Friedrich-Univ. Germany, Proceedings. 20th International Parallel and Distributed Processing Symposium Rhodes Island, Greece; (IEEE Cat. No. 06TH8860), 2006, 8 pp.

\* cited by examiner

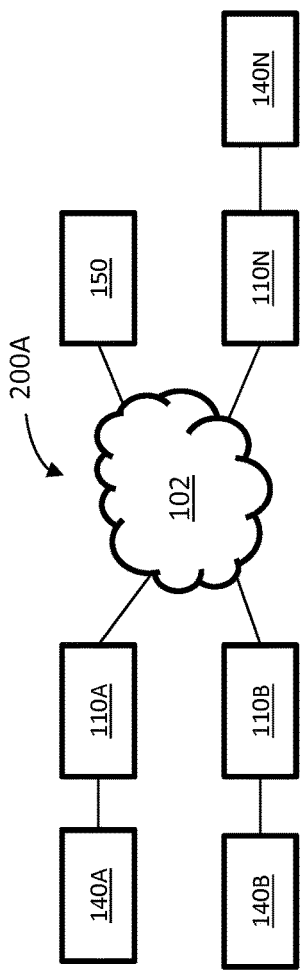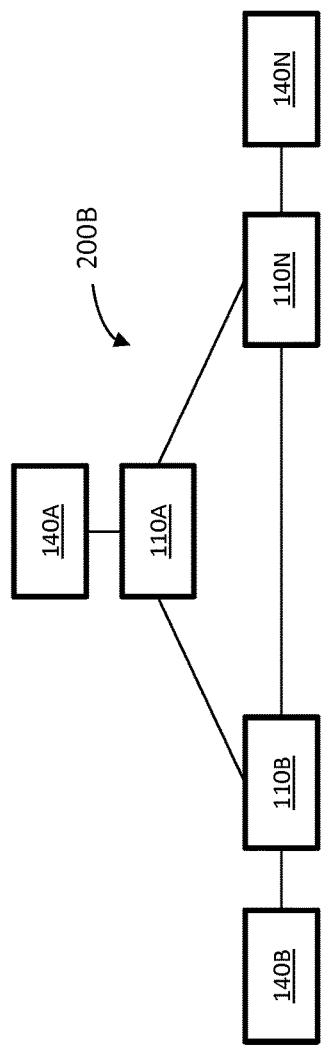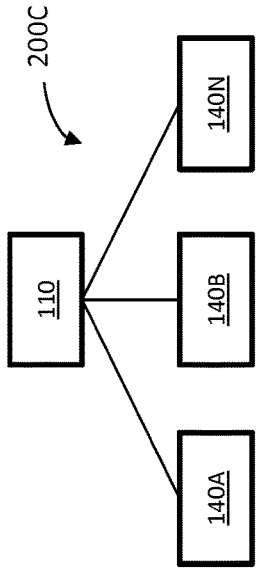

SYSTEM AND METHOD FOR TRANSPARENTLY STYLING NON-PLAYER CHARACTERS IN A MULTIPLAYER VIDEO GAME

CROSS-REFERENCE TO RELATED APPLICATIONS

This application is a continuation application of U.S. patent application Ser. No. 14/572,240, entitled "System and Method for Transparently Styling Non-Player Characters in a Multiplayer Video Game" and filed on Dec. 16, 2014, is hereby incorporated herein by reference in its entirety.

FIELD OF THE INVENTION

The invention relates generally to video games, and more particularly to a system and method for transparently styling non-player characters in multiplayer video games such that it is difficult to distinguish between human players and computer-controlled non-player characters.

BACKGROUND OF THE INVENTION

Multiplayer video games have exploded in popularity due, in part, to services such as Microsoft's Xbox LIVE® and Sony's PlayStation Network® which enable gamers all over the world to play with or against one another. Generally, a multiplayer video game is a video game in which two or more players play in a gameplay session in a cooperative or adversarial relationship. At least one of the players may comprise a human player, while one or more other players may comprise either non-player characters and/or other human players.

A non-player character ("NPC"), which may also be referred to as a non-person character, a non-playable character, a bot, or other similar descriptor, is a character in a game that is not controlled by a human player. In multiplayer video games, an NPC is typically a character controlled by a computer through artificial intelligence.

Often times, when a player logs in to a game system or platform to play a multiplayer video game, the player may engage in a gameplay session in which he or she is matched with other players to play together (on the same team or as opponents). A given player may engage in multiple gameplay sessions during a login session. In addition, each gameplay session may be played with either the same or a different group of matched players.

In some instances, NPCs are used to fill gap(s) in a gameplay session. As an example, in a game that requires ten players to play together on a team, four NPCs may be selected to fill out the team if only six human players have joined. This situation often occurs in matches (games or contests) with novice or lower-skilled players. Unfortunately, NPCs are often easily identified as "generic" or non-human, computer-controlled players. Various indicators including unusual screen names (or gamer tags), incomplete or uncharacteristic player profiles (e.g., having statistics or other attributes that are missing or that do not resemble those of typical players), and idiosyncratic play (during actual gameplay) are each examples of indicators that may alert human players to the presence of one or more NPCs in a given gameplay session.

The use of NPCs in a gameplay session may result in a poor or unsatisfying player experience. Novice or lower-skilled players, for instance, may feel frustrated or discouraged if they continually play in matches filled with NPCs, or believe that they aren't enjoying a true multiplayer game experience. This may result in a decreased desire to continue playing the video game. These and other drawbacks exist with the current use of NPCs in multiplayer video games.

SUMMARY OF THE INVENTION

The invention addressing these and other drawbacks relates to a system and method for transparently styling NPCs in multiplayer video games such that it is difficult to distinguish between human players and computer-controlled NPCs.

Particularly, in some implementations, NPCs may be styled to resemble human players in terms of both player profile attributes and gameplay actions such that players may not recognize NPCs as non-human, computer-controlled players.

Additionally, or alternatively, NPCs and/or human players may be presented with a limited set of profile attributes that may reduce or eliminate the ability to distinguish between human players and NPCs, one or more profile attributes may be "anonymized," and/or the ability to view (or otherwise access) player profiles of human players and/or NPCs may be disabled altogether. In some implementations, in certain gameplay sessions including, without limitation, a real gameplay session and/or a practice gameplay session (e.g., associated with a "practice" or "training" mode of a game), human players may be prompted to select from among a predetermined set of playable characters having predefined profile attributes (e.g., in-game items such as weapons, powers, skills, customizations, or other profile attributes). Other configurations may be implemented.

While aspects of the invention may be described herein with reference to various game levels or modes, characters, roles, game items, etc. associated with a First-Person-Shooter (FPS) game, it should be appreciated that any such examples are for illustrative purposes only, and are not intended to be limiting. The system and method described in detail herein may be used in any genre of multiplayer video game, without limitation.

Further, as used herein, the term "match" refers to a matching of two or more players, rather than a contest. For example, a potential match refers to a potential grouping of two or more players.

According to an aspect of the invention, a matchmaking application may identify one or more players that are waiting to be matched, such as players whose characters are waiting in a virtual game lobby to join a gameplay session. The gameplay session may comprise any type of gameplay session including, without limitation, a real gameplay session and/or a practice gameplay session (e.g., associated with a "practice mode" of a game).

In one implementation, a matching engine may generate one or more matches by grouping two or more of the identified players. The matching engine may use known or hereafter-developed matchmaking techniques to generate a match (e.g., interchangeably referred to herein as "matchmaking") by grouping players in an effort to produce the most satisfying player experiences. Game profiles, player profiles, match variables, and other factors may be considered when generating matches.

In one implementation, a game profile may be generated for a gameplay session based on gameplay information. Gameplay information may describe various game characteristics of a gameplay session that may influence the quality of gameplay. For example, gameplay information may include, without limitation, a number of players, types of roles (e.g., snipers), types of in-game items used or purchased (e.g., weapons, vehicles, armor, custom suits, custom paint, tires, engine modifications, etc.), composition of teams (e.g., number and/or types of roles in each team), maps or game levels played (e.g., battle zones, racetracks, sporting arenas, etc.), duration of gameplay (e.g., how duration of a given gameplay session), player skill levels, player styles (e.g., aggressive, prefers to be a sniper, etc.), types of matches (e.g., team death match, capture the flag, etc.), and/or other information related to a gameplay session.

According to an aspect of the invention, a player profile may be generated for a player based on player information. Player information may describe various characteristics of a player, which may be used to assess whether the player will enjoy a given gameplay session, a match, and/or a game. For example, player information may comprise a variety of player attributes including, without limitation, screen name (or gamer tag), style of gameplay (e.g., aggressive), a role preference (e.g., an explicit indication by the player of such preference), a role actually played, a duration of gameplay sessions, a number of gameplay sessions played by in a given login session, in-game items used or purchased by the player, membership in a clan or team, preference to play with clan mates or friends, demographic information of the player (e.g., geographic location, gender, income level, etc.), win/loss records, scores, and/or other information that may be used to determine whether a player will enjoy a given gameplay session, a match, and/or a game.

According to an aspect of the invention, a player profile may further include a numerical value or other metric representative of the player's overall player skill. A player skill value may, for example, be determined according to historical player performance data represented (or conveyed) by one or more player profile attributes. For example, player profile attributes such as number of games played, winning percentage, highest score, lowest score, and the like may be used to determine a player skill value, which may be continually updated and stored over time.

Matches may additionally be based on one or more match variables associated with each player in a match. The one or more match variables may relate to at least one player's characteristic that may influence whether a player enjoys gameplay while placed in a match. For example, and without limitation, a match variable may include a latency between players (e.g., a delay time for data communication between players' gaming systems or platforms such that lower latency is preferentially matched), a player skill level, a team composition (e.g., a role played by each player of a potential match), a presence or absence of preferred players (e.g., clan members, friends, etc.), a time that a player has waited to be matched (e.g., a player having a longer wait time may be preferentially matched), a location of a player (e.g., players geographically close to one another may be preferentially matched), one or more explicit user preferences received from a player, and/or other match variables.

According to an aspect of the invention, a gap in a number of players required for a gameplay session may be identified. For example, in a gameplay session that requires a predetermined number of players to play on a team, gaps (or available player slots) may be identified if there are not enough human players identified to satisfy the predetermined number of players after passage of a predetermined time period.

According to an aspect of the invention, a determination may be made as to whether NPCs should be used to fill identified gaps (available player slots). This determination may be based on a myriad of factors.

For example, in one implementation, the matching engine may make a determination to utilize one or more NPCs if a requisite number of human players has not joined a gameplay session after a predetermined time period so as to not unnecessarily delay gameplay for one or more waiting human players. Additionally or alternatively, the determination to utilize one or more NPCs may be based on a skill level of the one or more waiting human players. In some implementations, human players may be made aware that NPCs may be used in a given match, even though it is not readily apparent which players are NPCs and which are human players.

In some implementations, human players may be provided with an option to fill one or more available player slots with NPCs. For example, in certain instances, a human player (e.g., the host of a multiplayer match) may designate whether available slots should be filled with NPCs, either with or without the other human players' knowledge. In other implementations, each human player may be provided the ability to indicate a preference as to whether available player slots should be filled with NPCs. A human player may indicate this preference, for example, in his or her player profile or through another interface.

In some implementations, the matching engine may elect to utilize NPCs if some threshold number of human players in the match indicate a willingness (or preference) to play with or against NPCs. For example, in some implementations, the matching engine may only utilize NPCs if all human players in the match indicate a willingness (or preference) to play with or against NPCs. Alternatively, the matching engine may utilize NPCs if a majority of players indicate a willingness (or preference) to play with NPCs, or if a majority of players do not oppose playing with or against NPCs.

According to an aspect of the invention, if a determination is made to forego the use of NPCs to fill identified gaps (available player slots), then human players that are waiting to be matched may continue to wait (e.g., in a virtual game lobby) to join a gameplay session until the requisite number of human players has been reached.

By contrast, if a determination is made that available slots will be filled with NPCs, an NPC management engine may select or generate NPCs to fill those slots. For instance, in some implementations, the NPC management engine may select and retrieve one or more NPCs from among a collection of pre-generated NPCs stored, for instance, in a database. Alternatively, the NPC management engine may generate one or more NPCs in real-time ("on the fly") when or more gaps in a gameplay session are identified.

In other implementations, one or more human players may designate the types of NPCs to be utilized (e.g., a designated team captain from each team may "draft" one or more NPCs to fill empty slots on their respective teams, a designated "host" player may select the NPCs to fill all empty slots, etc.).

In many video games, players are able to view (or otherwise access) player profiles of other players and NPCs. As such, NPCs are often easily identified as "generic" or non-human, computer-controlled players based on things like unusual screen names (or gamer tags), and/or incomplete or uncharacteristic player profiles (e.g., having attributes, historical performance data, or other characteristics that are missing and/or do not resemble those of typical human players). As such, regardless of whether NPCs are selected or generated, or made available for selection by one or more human players, various implementations may be utilized to make it difficult to distinguish between human players and computer-controlled NPCs.

For example, in some implementations, NPCs may be styled to resemble human players in terms of both player profile attributes and gameplay actions such that players may not recognize NPCs as non-human, computer-controlled players. For instance, according to an aspect of the invention, an NPC profile engine may populate a NPC profile (either in real-time when an NPC is generated, or for later retrieval) with attributes and attribute values typical of other human players in a gameplay session. In other words, any player profile attributes that may exist for a human player may also be provided and displayable for an NPC, regardless of whether one or more of the NPC attributes may be populated with non-actionable (or dummy) data. In this regard, a human player that views or otherwise accesses a NPC player profile may be led to believe that the NPC is actually a human player. Various player profile attributes typical of human gamers, yet not necessarily needed for an NPC, may be created and displayed in an NPC player profile. In this regard, an NPC may appear human if its NPC player profile is viewed or accessed by human players.

A variety of known computational and/or statistical methods may be used to ensure that an NPC is generated (for current gameplay or later selection) having attributes and attribute values typical of other human players in a gameplay session. In one example, attribute values for an NPC may be generated in real-time based on the attribute values of one or more human players. In instances where more than one NPC is required to fill gaps in a gameplay session, NPCs may be generated or selected to have different player skill levels (or other player profile attribute values) that span the spectrum of the player skill levels of the human players. In this manner, multiple NPCs may behave differently during gameplay, thereby further conveying the appearance of being actual human players rather than computer-controlled characters behaving identically.

According to an aspect of the invention, NPCs may be further selected or generated according to a desired mix or balance of player roles or types for a given gameplay session. Other factors including, but not limited to, game profiles (described above) may be considered when selecting or generating NPCs for a gameplay session.

Additionally, or as an alternative to styling NPCs to resemble human players, NPCs and/or human players may be similarly styled by, for example, presenting each with a limited set of profile attributes that may reduce or eliminate the ability to distinguish between them. In such an implementation, a human player may understand that the match may comprise both NPC and human players, but it remains difficult to discern whether a particular player is human or NPC.

For example, the presentation of (or ability to view or otherwise access) human and NPC player profiles may be limited to certain profile attributes in an effort to obscure identifying information that may be used to discern a human player from an NPC. In other words, upon accessing a profile for either a human player or NPC, only one or more predetermined profile attributes may be made visible. The remaining profile attributes may be "blacked-out" (or otherwise obscured or redacted), or omitted altogether. In some implementations, a second player profile including only certain profile attributes may be generated "on the fly" for each human player or NPC in a match, with only the second player profiles being made accessible to each human player in the match. Other configurations may be implemented.

Additionally, or alternatively, one or more profile attributes may be "anonymized." For example, in some implementations, human players' personalized screen names may be replaced with a relatively anonymous screen name, or other similar (generic) descriptor.

Additionally, or alternatively, in some implementations, in certain gameplay sessions including without limitation a real gameplay session and/or a practice gameplay session (e.g., associated with a "practice" or "training" mode of a game), human players may be prompted to select from among a predetermined set of playable characters having predefined profile attributes.

Further, in some implementations, various in-game features such as chat/communication features may be disabled altogether or limited to certain preset phrases, instructions, commands, and/or signals. In this regard, a lack of (or limited) communication between players in a gameplay session may prevent a human player from discovering that a teammate or opponent is a NPC based on a non-response, or an idiosyncratic or unusual response.

In some implementations of the invention, the ability to view (or otherwise access) player profiles of human players and/or NPCs may be disabled altogether.

According to an aspect of the invention, once one more NPCs have been selected or generated to fill gaps in a gameplay session, a gameplay session including the human players and NPC(s) may be initiated. During gameplay, an Artificial Intelligence ("AI") engine may control an NPC's behavior (including gameplay actions) such that the NPC's gameplay more closely mimics the gameplay of the human players. As previously noted, idiosyncratic play by an NPC during actual gameplay may be an indicator that the character is an NPC and not a human player. By styling an NPC's gameplay tendencies to resemble that of a human player, the human players in the gameplay session may not recognize the NPC as a non-human, computer-controlled player.

In one implementation, the AI engine may analyze an NPC player profile to determine an appropriate skill level of play of the NPC. The AI engine may then analyze gameplay state information associated with one or more similarly-situated human players gathered over time to determine appropriate gameplay behavior for the NPC. In this regard, an NPC that is styled to play like a novice human player, for example, can actually play like a novice human player based on the past performance of other real, novice human players in similar game instances.

In one implementation, an NPC may be directed (or trained) by the AI engine to engage in gameplay behavior that might not typically be associated with that of an NPC. For example, an NPC may be directed to demonstrate behavior such as friendliness (e.g., an NPC that demonstrates sportsman-like conduct during gameplay might be someone that a human player would enjoy playing with again), helpfulness (e.g., an NPC may assist another player via shared strategies or other scenarios), or team-oriented behavior (e.g., an NPC may play toward a common goal).

In one implementation, a NPC may be afforded access to all game objects (e.g., weapons, powers, skills, etc.) that human players may access or earn during gameplay. Oftentimes, an NPC may be easy to identify because they typically only use a certain game object in a certain gameplay situation. By varying these types of "default" behaviors or actions, and enabling NPCs to use or access different game objects in different gameplay situations, NPCs may appear more human-like in their actions.

In various multiplayer matches, during a gameplay session, a human player may earn experience points, virtual currency, or some other accumulated virtual score/benefit that may allow the player to increase his or her level or status, or otherwise progress in the game (for example, by unlocking content or purchasing virtual goods).

In some implementations of the invention, an amount of experience points (or other accumulated virtual score/benefit) earned in a given multiplayer match may be based on the presence of NPCs in the match. For example, in some instances, an amount of experience points (or other accumulated virtual score/benefit) earned in a match with NPCs may be discounted by a predefined percentage or amount because the match included non-human, computer-controlled players.

In other implementations, only experience points (or other accumulated virtual score/benefit) relating to certain gameplay achievements will be affected. For example, killing an NPC opponent may earn less experience points (or other accumulated virtual score/benefit) than killing a human opponent.

In yet other implementations, no experience points (or other accumulated virtual score/benefit) may be awarded in a match with NPCs.

According to an aspect of the invention, the AI engine may monitor NPC gameplay performance in an effort to continually improve NPC performance, logic, strategy, and/or other NPC characteristics.

In some implementations, an NPC may be used over and over in multiple gameplay sessions, and the AI engine may fine tune the performance of the NPC each time so that it behaves in a manner more and more consistent with that of the human players in its gameplay sessions. In this regard, a plurality of NPCs may be created and fine-tuned for each skill level (e.g. beginner, advanced beginner, intermediate, expert, etc.) in a video game.

In implementations wherein an NPC is not saved or stored for later gameplay sessions, the AI engine may nonetheless fine tune one or more of the NPC's player profile attributes and save them in a template or model for later use when generating NPCs to fill gaps.

In one implementation, the AI engine may further consider human player satisfaction metrics when determining when, how, and to what extent NPC performance, logic, strategy, and/or other NPC characteristics may be refined.

For example, according to an aspect of the invention, one or more quality factors may be used to gauge whether gameplay associated with a given match was satisfying to one or more human players. Examples of quality factors may include, for example, a player quitting a match or gameplay session (indicating dissatisfaction), a duration of a game session (e.g., a longer duration may indicate greater satisfaction), a gameplay performance factor (e.g., a kill-to-death ratio in a shooter game, a lap time in a racing game, etc., where greater performance may indicate greater satisfaction), a player engagement factor (e.g., a speed of player input, a level of focus as determined from camera peripherals, etc., where greater engagement may indicate greater satisfaction), a competition level of a game (e.g., whether lopsided or not, where evenly matched games may indicate greater satisfaction), a biometric factor (e.g., facial expressions, pulse, body language, sweat, etc.), explicit feedback from a player (e.g., responses to a survey), and/or other observable metric related to gameplay. One or more of these quality factors may be used to determine whether an NPC's performance either contributed to, or took away from, a human player's enjoyment of a gameplay session.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates an exemplary system configuration in which a server hosts a plurality of computer devices to facilitate a multiplayer game, according to an implementation of the invention.

FIG. 2B illustrates an exemplary system configuration in which a plurality of networked servers communicate with one another to facilitate a multiplayer game, according to an implementation of the invention.

FIG. 2C illustrates an exemplary system configuration in which a plurality of computer devices are networked together to facilitate a multiplayer game, according to an implementation of the invention.

DETAILED DESCRIPTION OF THE INVENTION

The invention described herein relates to a system and method for transparently styling NPCs in multiplayer video games, such that it is difficult to distinguish between human players and computer-controlled NPCs.

Exemplary System Architecture

Figure 1:
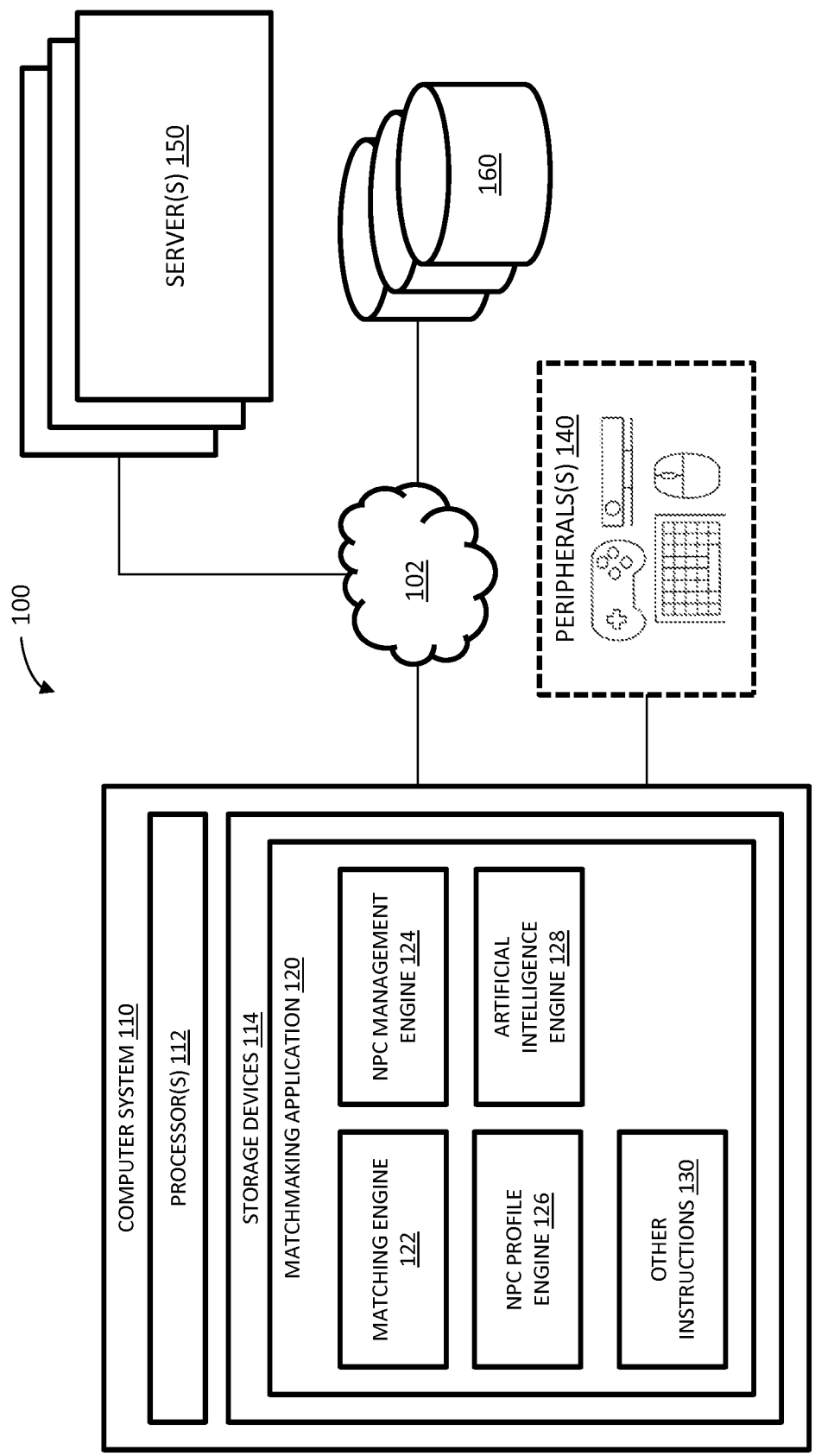
FIG. 1 illustrates an exemplary system for transparently styling NPCs, according to an implementation of the invention.

FIG. 1 depicts an exemplary architecture of a system 100 which may include one or more computer systems 110, one or more servers 150, one or more databases 160, and/or other components.

Computer System 110

Computer system 110 may be configured as a gaming console, a handheld gaming device, a personal computer (e.g., a desktop computer, a laptop computer, etc.), a smartphone, a tablet computing device, and/or other device that can be used to interact with an instance of a video game.

Computer system 110 may include one or more processors 112 (also interchangeably referred to herein as processors 112, processor(s) 112, or processor 112 for convenience), one or more storage devices 114 (which may store a matchmaking application 120), one or more peripherals 140, and/or other components. Processors 112 may be programmed by one or more computer program instructions. For example, processors 112 may be programmed by matchmaking application 120 and/or other instructions (such as gaming instructions used to instantiate the game).

Depending on the system configuration, matchmaking application 120 (or portions thereof) may be part of a game application, which creates a game instance to facilitate gameplay. Alternatively or additionally, matchmaking application 120 may run on a device such as a server 150 to determine matches for users in an "online" game hosted by server 150.

Matchmaking application 120 may include instructions that program computer system 110. The instructions may include, without limitation, a matching engine 122, an NPC management engine 124, a NPC profile engine 126, an Artificial Intelligence ("AI") engine 128, and/or other instructions 130 that program computer system 110 to perform various operations, each of which are described in greater detail herein. As used herein, for convenience, the various instructions will be described as performing an operation, when, in fact, the various instructions program the processors 112 (and therefore computer system 110) to perform the operation.

Peripherals 140

Peripherals 140 may be used to obtain an input (e.g., direct input, measured input, etc.) from a player. Peripherals 140 may include, without limitation, a game controller, a gamepad, a keyboard, a mouse, an imaging device such as a camera, a motion sensing device, a light sensor, a biometric sensor, and/or other peripheral device that can obtain an input from a player. Peripherals 140 may be coupled to a corresponding computer system 110 via a wired and/or wireless connection.

Server 150

Server 150 may include one or computing devices. Although not illustrated in FIG. 1, server 150 may include one or more physical processors programmed by computer program instructions. For example, server 150 may include all or a portion of matchmaking application 120 and therefore provide all or a portion of the operations of matchmaking application 120.

Although illustrated in FIG. 1 as a single component, computer system 110 and server 150 may each include a plurality of individual components (e.g., computer devices) each programmed with at least some of the functions described herein. In this manner, some components of computer system 110 and/or server 150 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Exemplary Multiplayer System Configurations

FIG. 2A illustrates an exemplary system configuration 200A in which a server hosts a plurality of computer devices to facilitate a multiplayer game, according to an implementation of the invention. In one implementation, one or more servers 150 may host a number of computer systems 110 (illustrated as computer systems 110A, 110B, . . . , 110N) via a network 102. Each computer system 110 may include one or more peripherals (illustrated as peripherals 140A, 140B, . . . , 140N). In this manner, one or more servers 150 may facilitate the gameplay of different players using different computer systems 110 and/or otherwise provide one or more operations of matchmaking application 120 (illustrated in FIG. 1).

In some instances, a given server 150 may be associated with a proprietary gameplay network system, such as, without limitation, Microsoft's Xbox LIVE® and Sony's PlayStation Network®, and/or another type of gameplay network system. In this implementation, a given computer system 110 may be associated with a particular type of gaming console. Other types of computer systems 110 using other types of gameplay networks may be used as well.

FIG. 2B illustrates an exemplary system configuration 200B in which a plurality of computer systems 110 are networked together to facilitate a multiplayer game, according to an implementation of the invention. Any one or more of the computer devices 110 may serve as a host and/or otherwise provide one or more operations of matchmaking application 120 (illustrated in FIG. 1).

FIG. 2C illustrates an exemplary system configuration 200C in which a computer system 110 is used by a plurality of users to facilitate a multiplayer game, according to an implementation of the invention. In an implementation, computer system 110 may be considered to host the multiplayer game and/or otherwise provide one or more operations of matchmaking application 120 (illustrated in FIG. 1).

Referring to FIGS. 2A-2C, in an implementation, a host may facilitate the multiplayer game and/or perform other operations described herein. In an implementation, at least some of these operations may also or instead be performed by an individual computer system 110. Furthermore, the illustrated system configurations are exemplary only and should not be viewed as limiting in any way. Other system configurations may be used as well, as would be appreciated by those having skill in the art.

Generating Matches

According to an aspect of the invention, matchmaking application 120 may identify one or more players that are waiting to be matched, such as players whose characters are waiting in a virtual game lobby to join a gameplay session. The gameplay session may comprise any type of gameplay session including, without limitation, a real gameplay session and/or a practice gameplay session (e.g., associated with a "practice" or "training" mode of a game).

In one implementation, a player may be added to a gameplay session immediately if there is an opening.

In one implementation, matching engine 122 may generate one or more matches by grouping two or more of the identified players. The number of players placed in each match may depend on a number of players waiting to be matched, a number of players needed for a game session (e.g., a number of players needed to form a team or start a match), a number of players that can be accommodated by a game session, and/or other information. Different matches may include different combinations of different players, which may include different numbers of players.

Matching engine 122 may use known or hereafter-developed matchmaking techniques to generate a match (e.g., interchangeably referred to herein as "matchmaking") by grouping players in an effort to produce the most satisfying player experiences. Game profiles, player profiles, match variables, and other factors may be considered when generating matches.

Game Profiles

In one implementation, a game profile may be generated for a gameplay session based on gameplay information. Gameplay information may describe various game characteristics of a gameplay session that may influence the quality of gameplay. For example, gameplay information may include, without limitation, a number of players, types of roles (e.g., snipers), types of in-game items used or purchased (e.g., weapons, vehicles, armor, custom suits, custom paint, tires, engine modifications, etc.), composition of teams (e.g., number and/or types of roles in each team), maps or game levels played (e.g., battle zones, racetracks, sporting arenas, etc.), duration of gameplay (e.g., how duration of a given gameplay session), player skill levels, player styles (e.g., aggressive, prefers to be a sniper, etc.), types of matches (e.g., team death match, capture the flag, etc.), and/or other information related to a gameplay session.

A game profile may be specific for a given gameplay session (e.g., different game profiles may be associated with different gameplay sessions) and/or may be used to generate a broader game profile for a particular game (e.g., different games may be associated with different game profiles). In this manner, a given game or gameplay session may be characterized using a game profile.

Player Profiles

According to an aspect of the invention, a player profile may be generated for a player based on player information. Player information may describe various characteristics of a player, which may be used to assess whether the player will enjoy a given gameplay session, a match, and/or a game.

For example, player information may comprise a variety of player attributes including, without limitation, screen name (or gamer tag), style of gameplay (e.g., aggressive), a role preference (e.g., an explicit indication by the player of such preference), a role actually played, a duration of gameplay sessions, a number of gameplay sessions played by in a given login session, in-game items used or purchased by the player, membership in a clan or team, preference to play with clan mates or friends, demographic information of the player (e.g., geographic location, gender, income level, etc.), win/loss records, scores, and/or other attributes or information without limitation that may be used to determine whether a player will enjoy a given gameplay session, a match, and/or a game.

Information from a player profile may be indexed by time. For example, the foregoing player information may include all player information known about a player, a subset of all information (e.g., information related to the last day, week, month, previous "N" number of game sessions, login sessions, etc.). In this manner, a player profile may relate to all-time gameplay of the player, recent gameplay of the player, time of day (e.g., a player may be associated with different player profiles at different times of the day, such as having an aggressive play style during evening hours and a more relaxed play style during morning hours), and/or other subset.

According to an aspect of the invention, a player profile may include a numerical value or other metric representative of the player's overall player skill. A player skill value may, for example, be determined according to historical player performance data represented (or conveyed) by one or more player profile attributes. For example, player profile attributes such as number of games played, winning percentage, highest score, lowest score, and the like may be used to determine a player skill value. It should be appreciated that the number and type of player profile attributes used to determine a player skill value may vary depending on the type of video game. As an example, in a first-person-shooter game, numerical values associated with attributes such as Score Per Minute ("SPM"), Kill/Death Ratio ("KDR"), Win/Loss Ratio ("WLR"), or other attributes may be used to generate a player skill value for the player. The player skill value may be continually updated and stored over time.

Match Variables

Matches may additionally be based on one or more match variables associated with each player in a match. The one or more match variables may relate to at least one player's characteristic that may influence whether a player enjoys gameplay while placed in a match. For example, and without limitation, a match variable may include a latency between players (e.g., a delay time for data communication between players' gaming systems or platforms such that lower latency is preferentially matched), a player skill level, a team composition (e.g., a role played by each player of a potential match), a presence or absence of preferred players (e.g., clan members, friends, etc.), a time that a player has waited to be matched (e.g., a player having a longer wait time may be preferentially matched), a location of a player (e.g., players geographically close to one another may be preferentially matched), one or more explicit user preferences received from a player, and/or other match variables.

Identifying a Gap in a Number of Required Players

According to an aspect of the invention, a gap in a number of players required for a gameplay session may be identified.

For example, in a gameplay session that requires a predetermined number of players to play on a team, gaps (or available player slots) may be identified if there are not enough human players identified to satisfy the predetermined number of players after passage of a predetermined time period.

Determining Whether to Fill Identified Gap(s) with NPCs

According to an aspect of the invention, the determination as to whether NPCs are used to fill identified gaps (available player slots) may be based on a myriad of factors.

For example, in one implementation, matching engine 122 may make a determination to utilize one or more NPCs if a requisite number of human players has not joined a gameplay session after a predetermined time period so as to not unnecessarily delay gameplay for one or more waiting human players. Additionally or alternatively, the determination to utilize one or more NPCs may be based on a skill level (e.g., beginner, intermediate, expert, etc.) of the one or more waiting human players. For example, if an average skill level of the waiting human players is less than a threshold skill level (e.g., less than an intermediate level), matching engine 122 may make the determination to utilize NPCs. In some implementations, human players may be made aware that NPCs may be used in a given match, even though it is not readily apparent which players are NPCs and which are human players.

In some implementations, human players may be provided with an option to fill one or more available player slots with NPCs. For example, in certain instances, a human player (e.g., the host of a multiplayer match) may designate whether available slots should be filled with NPCs, either with or without the other human players' knowledge. In other implementations, each human player may be provided the ability to indicate a preference as to whether available player slots should be filled with NPCs. A human player may indicate this preference, for example, in his or her player profile or through another interface.

In some implementations, matching engine 122 may elect to utilize NPCs if some threshold number of human players in the match indicate a willingness (or preference) to play with or against NPCs. For example, in some implementations, matching engine 122 may only utilize NPCs if all human players in the match indicate a willingness (or preference) to play with or against NPCs. Alternatively, matching engine 122 may utilize NPCs if a majority of players indicate a willingness (or preference) to play with NPCs, or if a majority of players do not oppose playing with or against NPCs.

Selecting or Generating NPCs to Fill Gaps

In some implementations, once a determination is made that available slots will be filled with NPCs, NPC management engine 124 may select or generate NPCs to fill those slots. For instance, in some implementations, NPC management engine 124 may select and retrieve one or more NPCs from among a collection of pre-generated NPCs stored, for instance, in database 160. Alternatively, NPC management engine 124 may generate one or more NPCs in real-time ("on the fly") when or more gaps in a gameplay session are identified.

In other implementations, one or more human players may designate the types of NPCs to be utilized (e.g., a designated team captain from each team may "draft" one or more NPCs to fill empty slots on their respective teams, a designated "host" player may select the NPCs to fill all empty slots, etc.).

Styling NPCs and/or Human Players

In many video games, players are able to view (or otherwise access) player profiles of other players and NPCs. As such, NPCs are often easily identified as "generic" or non-human, computer-controlled players based on things like unusual screen names (or gamer tags), and/or incomplete or uncharacteristic player profiles (e.g., having attributes, historical performance data, or other characteristics that are missing and/or do not resemble those of typical human players).

Regardless of whether NPCs are selected or generated, or made available for selection by one or more human players, various implementations may be utilized to make it difficult to distinguish between human players and computer-controlled NPCs.

For example, in some implementations, NPCs may be styled to resemble human players in terms of both player profile attributes and gameplay actions such that players may not recognize NPCs as non-human, computer-controlled players.

Additionally, or alternatively, NPCs and/or human players may be similarly styled in a number of ways (described in greater detail below).

Styling NPCs to Resemble Human Players

According to an aspect of the invention, NPC profile engine 126 may populate a NPC profile (either in real-time when an NPC is generated, or for later retrieval) with attributes and attribute values typical of other human players in a gameplay session. In other words, any player profile attributes that may exist for a human player may also be provided and displayable for an NPC, regardless of whether one or more of the NPC attributes may be populated with non-actionable (or dummy) data. In this regard, a human player that views or otherwise accesses a NPC player profile may be led to believe that the NPC is actually a human player. Player profile attributes including demographic information (e.g., geographic location, gender, income level, etc.) may be created and displayed in an NPC player profile, along with player appearance preferences (e.g., player and weapon skins), membership in a "fake" clan or team, preference to play with clan mates or friends, win/loss records, scores, and/or other information typical of human gamers, yet not necessarily needed for a NPC. In this regard, an NPC may appear human if its NPC player profile is viewed or accessed by human players.

A variety of known computational and/or statistical methods may be used to ensure that an NPC is generated (for current gameplay or later selection) having attributes and attribute values typical of other human players in a gameplay session. In one example, attribute values for an NPC may be generated in real-time based on the attribute values of one or more human players. By way of non-limiting example, in a first-person-shooter video game, a single NPC may be needed to join four human players in order to field a team of five players required for a particular gameplay session. As a result of a matchmaking process, the four human players may comprise "beginner" players that have been matched together based on, for instance, similar player skill values (e.g., player skill values within a predetermined range, standard deviation, etc.), or other criteria. As an example, Player #1 may have a player skill value of 100, Player #2 may have a player skill value of 95, Player #3 may have a player skill value of 110, and Player #4 may have a player skill value of 90. As such, NPC profile engine 126 may generate a player skill level for the NPC commensurate with those of the four human players. For example, the NPC may be assigned a player skill level of 98.75 (or 99), which is an average of the player skill levels of the four human players. Alternatively, the NPC may be assigned a player skill level somewhere between 90 and 110, which represents the range of the player skill levels of the four players.

While the aforementioned, non-limiting example demonstrates how a single player profile attribute value (player skill level) may be calculated, it should be appreciated that similar calculations may be effectuated for each profile attribute for the NPC. For example, in the first-person-shooter game referenced above, the player skill value may be generated based on attributes such as Score Per Minute ("SPM"), Kill/Death Ratio ("KDR"), and Win/Loss Ratio ("WLR"). As such, NPC profile engine 126 may (via use of averages, ranges, or other known computational and/or statistical methods) populate the NPC player profile with numerical values (or other metrics) for each of the SPM, KDR, and WLR in addition to the player skill level. As such, a human player that views the NPC player profile will be able to view a set of metrics underlying (or supporting) the NPC's player skill level, thereby further giving the NPC the appearance of being a real (human) player.

In other implementations, NPC profile engine 126 may determine a player profile attribute value (or metric) for an NPC, and then use the determined attribute level (or metric) to retrieve pre-stored templates having associated player profile attribute values that support the determined attribute value. Continuing with the foregoing first-person-shooter example, NPC profile engine 126 may determine that the player skill level for the NPC is 98.75 (or 99), or within the range of 90 and 110, and then retrieve a pre-stored template having numerical values (or other metrics) for each of the SPM, KDR, and WLR that are consistent with a player having a player skill level of 98.75 (or 99), or within the range of 90 and 110. These templates may be generated and based on historical player performance data of multiple players over time, and updated.

In instances where more than one NPC is required to fill gaps in a gameplay session, NPCs may be generated or selected to have different player skill levels (or other player profile attribute values) that span the spectrum of the player skill levels of the human players. In this manner, multiple NPCs may behave differently during gameplay, thereby further conveying the appearance of being actual human players rather than computer-controlled characters behaving identically. Continuing once again with the first-person-shooter example above, if only three human players were available, and two NPCs were needed for a gameplay session, one NPC may be generated or selected to have a player skill level at or near the lower end of the range of player skill levels of the human players, while the other NPC may be generated or selected to have a player skill level at or near the higher end of the range of player skill levels of the human players.

According to an aspect of the invention, NPCs may be further selected or generated according to a desired mix or balance of player roles or types for a given gameplay session. As an example, in a first-person-shooter game in which five snipers and five run-and-gunners represent an optimal mix of player roles, NPC management engine 124 may select NPCs to fill gaps such that the desired combination of five snipers and five run-and-gunners is achieved to the extent possible. Other factors including, but not limited to game profiles (described above), may be considered when selecting or generating NPCs for a gameplay session.

Similarly Styling NPCs and Human Players

Additionally, or as an alternative to styling NPCs to resemble human players, NPCs and/or human players may be similarly styled by, for example, presenting each with a limited set of profile attributes that may reduce or eliminate the ability to distinguish between them. In such an implementation, a human player may understand that the match may comprise both NPC and human players, but it remains difficult to discern whether a particular player is human or NPC.

For example, the presentation of (or ability to view or otherwise access) human and NPC player profiles may be limited to certain profile attributes in an effort to obscure identifying information that may be used to discern a human player from an NPC. In other words, upon accessing a profile for either a human player or NPC, only one or more predetermined profile attributes may be made visible. The remaining profile attributes may be "blacked-out" (or otherwise obscured or redacted), or omitted altogether. In some implementations, a second player profile including only certain profile attributes may be generated "on the fly" for each human player or NPC in a match, with only the second player profiles being made accessible to each human player in the match. Other configurations may be implemented.

Additionally, or alternatively, one or more profile attributes may be "anonymized." For example, in some implementations, human players' personalized screen names may be replaced with a relatively anonymous screen name such as "Friend," "Enemy," "Blue Team," "Red Team," "Player A," "Player B," "Player 1," "Player 2," or other similar (generic) descriptor.

Additionally, or alternatively, in some implementations, in certain gameplay sessions including without limitation a real gameplay session and/or a practice gameplay session (e.g., associated with a "practice" or "training" mode of a game), human players may be prompted to select from among a predetermined set of playable characters having predefined profile attributes (e.g., in-game items such as weapons, powers, skills, customizations, or other profile attributes).

Further, in some implementations, various in-game features such as chat/communication features may be disabled altogether or limited to certain preset phrases, instructions, commands, and/or signals. In this regard, a lack of (or limited) communication between players in a gameplay session may prevent a human player from discovering that a teammate or opponent is a NPC based on a non-response, or an idiosyncratic or unusual response.

In some implementations of the invention, the ability to view (or otherwise access) player profiles of human players and/or NPCs may be disabled altogether.

Other configurations may be implemented.

Gameplay Behavior

According to an aspect of the invention, once one more NPCs have been selected or generated to fill gaps in a gameplay session, and the NPCs and/or human players have been styled, a gameplay session including the human players and NPC(s) may be initiated.

During gameplay, AI engine 128 may control an NPC's behavior (including gameplay actions) such that the NPC's gameplay more closely mimics the gameplay of the human players. As previously noted, idiosyncratic play by an NPC during actual gameplay may be an indicator that the character is an NPC and not a human player. By styling an NPC's gameplay tendencies to resemble that of a human player, the human players in the gameplay session may not recognize the NPC as a non-human, computer-controlled player.

In one implementation, AI engine 128 may analyze an NPC player profile (as selected or generated in the manner described above) to determine an appropriate skill level of play of the NPC. AI engine 128 may then analyze gameplay state information associated with one or more similarly-situated human players gathered over time (e.g., and stored in database 160) to determine appropriate gameplay behavior for the NPC. In this regard, an NPC that is styled to play like a novice human player, for example, can actually play like a novice human player based on the past performance of other real, novice human players in similar game instances.

In one implementation, an NPC may be directed (or trained) by AI engine 128 to engage in gameplay behavior that might not typically be associated with that of an NPC. For example, an NPC may be directed to demonstrate behavior such as friendliness (e.g., an NPC that demonstrates sportsman-like conduct during gameplay might be someone that a human player would enjoy playing with again), helpfulness (e.g., an NPC may assist another player via shared strategies or other scenarios), or team-oriented behavior (e.g., an NPC may play toward a common goal).

In one implementation, a NPC may be afforded access to all game objects (e.g., weapons, powers, skills, etc.) that human players may access or earn during gameplay. Oftentimes, an NPC may be easy to identify because they typically only use a certain game object in a certain gameplay situation. By varying these types of "default" behaviors or actions, and enabling NPCs to use or access different game objects in different gameplay situations, NPCs may appear more human-like in their actions.

Gameplay Scoring Considerations

According to an aspect of the invention, in various multiplayer matches, a human player may earn experience points, virtual currency, or some other accumulated virtual score/benefit that may allow the player to increase his or her level or status, or otherwise progress in the game (for example, by unlocking content or purchasing virtual goods). As a non-limiting example, in a first-person-shooter game, a player may earn experience points for kills, kill assists, victories, playing a certain amount of time or number of matches, or any other gameplay-related achievement. Typically, the amount of experience points (or other accumulated virtual score/benefit) earned for a particular achievement is predefined.

In some implementations of the invention, an amount of experience points (or other accumulated virtual score/benefit) earned in a given multiplayer match may be based on the presence of NPCs in the match. For example, in some instances, an amount of experience points (or other accumulated virtual score/benefit) earned in a match with NPCs may be discounted by a predefined percentage or amount because the match included non-human, computer-controlled players.

In other implementations, only experience points (or other accumulated virtual score/benefit) relating to certain gameplay achievements will be affected. For example, killing an NPC opponent may earn less experience points (or other accumulated virtual score/benefit) than killing a human opponent.

In yet other implementations, no experience points (or other accumulated virtual score/benefit) may be awarded in a match with NPCs.

Feedback

According to an aspect of the invention, AI engine 128 may monitor NPC gameplay performance in an effort to continually improve NPC performance, logic, strategy, and/or other NPC characteristics.

In some implementations, an NPC may be used over and over in multiple gameplay sessions, and AI engine 128 may fine tune the performance of the NPC each time so that it behaves in a manner more and more consistent with that of the human players in its gameplay sessions. In this regard, NPC management engine 124 may, over time, have access to a plurality of NPCs (e.g., stored in database 160) that have been fine-tuned for each skill level (e.g, beginner, advanced beginner, intermediate, expert, etc.).

In implementations wherein an NPC is not saved or stored for later gameplay sessions, AI engine 128 may nonetheless fine tune one or more of the NPC's player profile attributes and save them in a template or model for later use by NPC management engine 124 and or NPC profile engine 126 when generating NPCs to fill gaps.

In one implementation, AI engine 128 may further consider human player satisfaction metrics when determining when, how, and to what extent NPC performance, logic, strategy, and/or other NPC characteristics may be refined. For example, according to an aspect of the invention, AI engine 128 may consider a level of satisfaction by one or more human players involved in a gameplay session. One or more quality factors used to gauge whether gameplay associated with a given match was satisfying may include observable metrics that indicate a human player's level of satisfaction with gameplay. Examples of quality factors include, without limitation, a player quitting a match or gameplay session while other players are still playing (indicating dissatisfaction), a duration of a game session (e.g., a longer duration may indicate greater satisfaction), a gameplay performance factor (e.g., a kill-to-death ratio in a shooter game, a lap time in a racing game, etc., where greater performance may indicate greater satisfaction), a player engagement factor (e.g., a speed of player input, a level of focus as determined from camera peripherals, etc., where greater engagement may indicate greater satisfaction), a competition level of a game (e.g., whether lopsided or not, where evenly matched games may indicate greater satisfaction), a biometric factor (e.g., facial expressions, pulse, body language, sweat, etc.), explicit feedback from a player (e.g., responses to a survey), and/or other observable metric related to gameplay. One or more of these quality factors may be used to determine whether an NPC's performance either contributed to, or took away from, a human player's enjoyment of a gameplay session.

Exemplary Flowchart

Figure 3:
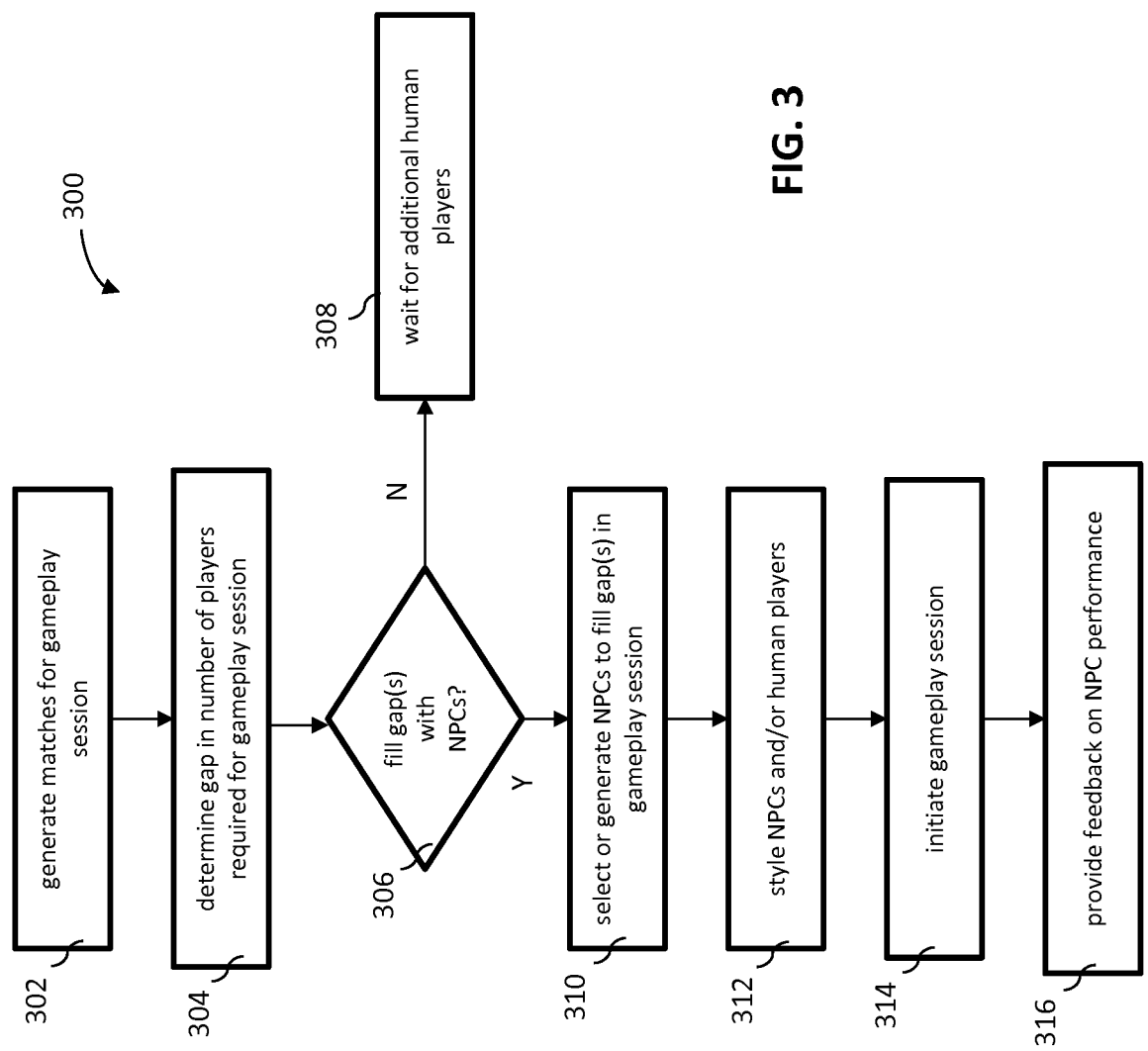
FIG. 3 depicts an exemplary flowchart of processing operations for transparently styling NPCs in multiplayer video games, according to an implementation of the invention.

FIG. 3 depicts an exemplary flowchart of processing operations for transparently styling NPCs in multiplayer video games, according to an implementation of the invention. The various processing operations and/or data flows depicted in FIG. 3 are described in greater detail herein. The described operations may be accomplished using some or all of the system components (enabling all of the features and functionality) described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Operation 302

In an operation 302, one or more human video game players that are waiting to be matched, such as players whose characters are waiting in a virtual game lobby to join a gameplay session, may be identified. In one implementation, a matching engine may use known or hereafter-developed matchmaking techniques to generate a match (e.g., interchangeably referred to herein as "matchmaking") by grouping players in an effort to produce the most satisfying player experiences. Game profiles, player profiles, match variables, and other factors may be considered when generating matches.

Operation 304

In an operation 304, a gap in a number of players required for a gameplay session may be identified. For example, in a gameplay session that requires a predetermined number of players to play on a team, gaps (or available player slots) may be identified if there are not enough human players identified to satisfy the predetermined number of players after passage of a predetermined time period.

Operation 306

In an operation 306, a determination may be made as to whether NPCs should be used to fill identified gaps (available player slots). This determination may be based on a myriad of factors.

For example, in one implementation, the matching engine may make a determination to utilize one or more NPCs if a requisite number of human players has not joined a gameplay session after a predetermined time period so as to not unnecessarily delay gameplay for one or more waiting human players. Additionally or alternatively, the determination to utilize one or more NPCs may be based on a skill level of the one or more waiting human players. In some implementations, human players may be made aware that NPCs may be used in a given match, even though it is not readily apparent which players are NPCs and which are human players.

In some implementations, human players may be provided with an option to fill one or more available player slots with NPCs. For example, in certain instances, a human player (e.g., the host of a multiplayer match) may designate whether available slots should be filled with NPCs, either with or without the other human players' knowledge. In other implementations, each human player may be provided the ability to indicate a preference as to whether available player slots should be filled with NPCs. A human player may indicate this preference, for example, in his or her player profile or through another interface.

In some implementations, the matching engine may elect to utilize NPCs if some threshold number of human players in the match indicate a willingness (or preference) to play with or against NPCs. For example, in some implementations, the matching engine may only utilize NPCs if all human players in the match indicate a willingness (or preference) to play with or against NPCs. Alternatively, the matching engine may utilize NPCs if a majority of players indicate a willingness (or preference) to play with NPCs, or if a majority of players do not oppose playing with or against NPCs.

Operation 308

If the determination is made, in operation 306, to forego the use of NPCs to fill identified gaps (available player slots), then, in an operation 308, human players that are waiting to be matched may continue to wait (e.g., in a virtual game lobby) to join a gameplay session until the requisite number of human players has been reached.

Operation 310

By contrast, if the determination is made, in operation 306, that available slots will be filled with NPCs, an NPC management engine may, in an operation 310, select or generate NPCs to fill those slots. For instance, in some implementations, the NPC management engine may select and retrieve one or more NPCs from among a collection of pre-generated NPCs stored, for instance, in a database. Alternatively, the NPC management engine may generate one or more NPCs in real-time ("on the fly") when or more gaps in a gameplay session are identified.

In other implementations, one or more human players may designate the types of NPCs to be utilized (e.g., a designated team captain from each team may "draft" one or more NPCs to fill empty slots on their respective teams, a designated "host" player may select the NPCs to fill all empty slots, etc.).

Operation 312

Regardless of whether NPCs are selected or generated, or made available for selection by one or more human players, various implementations may be utilized to make it difficult to distinguish between human players and computer-controlled NPCs.

For example, in an operation 312, NPCs may be styled to resemble human players in terms of both player profile attributes and gameplay actions such that players may not recognize NPCs as non-human, computer-controlled players.

For example, according to an aspect of the invention, an NPC profile engine may populate a NPC profile (either in real-time when an NPC is generated, or for later retrieval) with attributes and attribute values typical of other human players in a gameplay session. In other words, any player profile attributes that may exist for a human player may also be provided and displayable for an NPC, regardless of whether one or more of the NPC attributes may be populated with non-actionable (or dummy) data. In this regard, a human player that views or otherwise accesses a NPC player profile may be led to believe that the NPC is actually a human player. Player profile attributes including demographic information (e.g., geographic location, gender, income level, etc.) may be created and displayed in an NPC player profile, along with player appearance preferences (e.g., player and weapon skins), membership in a "fake" clan or team, preference to play with clan mates or friends, win/loss records, scores, and/or other information typical of human gamers, yet not necessarily needed for a NPC. In this regard, an NPC may appear human if its NPC player profile is viewed or accessed by human players.

A variety of known computational and/or statistical methods may be used to ensure that an NPC is generated (for current gameplay or later selection) having attributes and attribute values typical of other human players in a gameplay session. Other factors including, but not limited to, game profiles and a desired mix or balance of player roles or types may be considered when selecting or generating NPCs for a gameplay session.

Additionally, or as an alternative to styling NPCs to resemble human players, NPCs and/or human players may be similarly styled in operation 312 by, for example, presenting each with a limited set of profile attributes that may reduce or eliminate the ability to distinguish between them. In such an implementation, a human player may understand that the match may comprise both NPC and human players, but it remains difficult to discern whether a particular player is human or NPC.

For example, the presentation of (or ability to view or otherwise access) human and NPC player profiles may be limited to certain profile attributes in an effort to obscure identifying information that may be used to discern a human player from an NPC. In other words, upon accessing a profile for either a human player or NPC, only one or more predetermined profile attributes may be made visible. The remaining profile attributes may be "blacked-out" (or otherwise obscured or redacted), or omitted altogether. In some implementations, a second player profile including only certain profile attributes may be generated "on the fly" for each human player or NPC in a match, with only the second player profiles being made accessible to each human player in the match. Other configurations may be implemented.

Additionally, or alternatively, one or more profile attributes may be "anonymized." For example, in some implementations, human players' personalized screen names may be replaced with a relatively anonymous screen name, or other similar (generic) descriptor.

Additionally, or alternatively, in some implementations, in certain gameplay sessions including without limitation a real gameplay session and/or a practice gameplay session (e.g., associated with a "practice" or "training" mode of a game), human players may be prompted to select from among a predetermined set of playable characters having predefined profile attributes.

Further, in some implementations, various in-game features such as chat/communication features may be disabled altogether or limited to certain preset phrases, instructions, commands, and/or signals. In this regard, a lack of (or limited) communication between players in a gameplay session may prevent a human player from discovering that a teammate or opponent is a NPC based on a non-response, or an idiosyncratic or unusual response.

In some implementations of the invention, the ability to view (or otherwise access) player profiles of human players and/or NPCs may be disabled altogether.

Operation 314

Once one more NPCs have been selected or generated to fill gaps in a gameplay session, a gameplay session including the human players and NPC(s) may be initiated in an operation 314. During gameplay, an artificial intelligence ("AI") engine may control an NPC's behavior (including gameplay actions) such that the NPC's gameplay more closely mimics the gameplay of the human players. By styling an NPC's gameplay tendencies to resemble that of a human player, the human players in the gameplay session may not recognize the NPC as a non-human, computer-controlled player.

In one implementation, the AI engine may analyze an NPC player profile (as selected or generated in the manner described above) to determine an appropriate skill level of play of the NPC. The AI engine may then analyze gameplay state information associated with one or more similarly-situated human players gathered over time (e.g., and stored in a database) to determine appropriate gameplay behavior for the NPC. In this regard, an NPC that is styled to play like a novice human player, for example, can actually play like a novice human player based on the past performance of other real, novice human players in similar game instances.

In one implementation, an NPC may be directed (or trained) by the AI engine to engage in gameplay behavior that might not typically be associated with that of an NPC. For example, an NPC may be directed to demonstrate behavior such as friendliness, helpfulness, or team-oriented behavior. Further, in some implementations, an NPC may be afforded access to all game objects (e.g., weapons, powers, skills, etc.) that human players may access or earn during gameplay.

Further, in various multiplayer matches, such as that initiated in operation 314, a human player may earn experience points, virtual currency, or some other accumulated virtual score/benefit that may allow the player to increase his or her level or status, or otherwise progress in the game (for example, by unlocking content or purchasing virtual goods).

In some implementations of the invention, an amount of experience points (or other accumulated virtual score/benefit) earned in a given multiplayer match may be based on the presence of NPCs in the match. For example, in some instances, an amount of experience points (or other accumulated virtual score/benefit) earned in a match with NPCs may be discounted by a predefined percentage or amount because the match included non-human, computer-controlled players.

In other implementations, only experience points (or other accumulated virtual score/benefit) relating to certain gameplay achievements will be affected. For example, killing an NPC opponent may earn less experience points (or other accumulated virtual score/benefit) than killing a human opponent.

In yet other implementations, no experience points (or other accumulated virtual score/benefit) may be awarded in a match with NPCs.

Operation 316

In an operation 316, the AI engine may monitor NPC gameplay performance in an effort to continually improve NPC performance, logic, strategy, and/or other NPC characteristics.

In some implementations, an NPC may be used over and over in multiple gameplay sessions, and the AI engine may fine tune the performance of the NPC each time so that it behaves in a manner more and more consistent with that of the human players in its gameplay sessions.

In implementations wherein an NPC is not saved or stored for later gameplay sessions, the AI engine may nonetheless fine tune one or more of the NPC's player profile attributes and save them in a template or model for later use when generating NPCs to fill gaps.

In one implementation, the AI engine 128 may further consider human player satisfaction metrics when determining when, how, and to what extent NPC performance, logic, strategy, and/or other NPC characteristics may be refined.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer-implemented method of generating one or more non-player characters in a multiplayer video game in a manner that resembles one or more characters controlled by human players, the method being implemented in a computer system having one or more physical processors programmed with computer program instructions that, when executed by the one or more physical processors, cause the computer system to perform the method, the method comprising:

identifying, by the computer system, one or more human players to be matched for a gameplay session the multiplayer video game, wherein each of the one or more human players has a player profile comprising at least a value indicative of a skill level of each of the one or more human players;

determining, by the computer system, whether a predetermined skill level value required for the gameplay session is met by a value that is a function of skill level values of the identified one or more human players; and obtaining, by the computer system, the one or more non-player characters to play in the gameplay session responsive to a determination that the predetermined skill value required for the gameplay session is not met by the value of the skill level of the identified one or more human players, wherein each of the one or more non-player characters has a non-player character player profile comprising at least a skill level value of the non-player character and wherein the predetermined skill level value required for the gameplay session is met by the value of the skill level of the identified one or more human players and skill level values of the obtained non-player characters; and generating the multiplayer video game with the obtained non-player characters.

2. A system for generating one or more non-player characters in a multiplayer video game in a manner that resembles one or more characters controlled by human players, the system comprising:

one or more physical processors programmed with one or more computer program instructions which, when executed, cause the one or more physical processors to:

identify one or more human players to be matched for a gameplay session of the multiplayer video game, wherein each of the one or more human players has a player profile comprising at least a value indicative of a skill level of each of the one or more human players;

determine whether a predetermined skill level value required for the gameplay session is met by a value that is a function of skill level values of the identified one or more human players;

obtain the one or more non-player characters to play in the gameplay session responsive to a determination that the predetermined skill value required for the gameplay session is not met by the value of the skill level of the identified one or more human players, wherein each of the one or more non-player characters has a non-player character player profile comprising at least a skill level value of the non-player character and wherein the predetermined skill level value required for the gameplay session is met by the value of the skill level of the identified one or more human players and skill level values of the obtained non-player characters; and generate the multiplayer video game with the obtained non-player characters.

3. A computer program product for generating one or more non-player characters in a multiplayer video game in a manner that resembles one or more characters controlled by human players, the computer program product comprising:

one or more tangible, non-transitory computer-readable storage devices;

program instructions, stored on at least one of the one or more tangible, non-transitory computer-readable tangible storage devices that, when executed, cause a computer to:

identify one or more human players to be matched for a gameplay session of the multiplayer video game, wherein each of the one or more human players has a player profile comprising at least a value indicative of a skill level of each of the one or more human players;

determine whether a predetermined skill level value required for the gameplay session is met by a value that is a function of skill level values of the identified one or more human players;

obtain the one or more non-player characters to play in the gameplay session responsive to a determination that the predetermined skill value required for the gameplay session is not met by the value of the skill level of the identified one or more human players, wherein each of the one or more non-player characters has a non-player character player profile comprising at least a skill level value of the non-player character and wherein the predetermined skill level value required for the gameplay session is met by the value of the skill level of the identified one or more human players and skill level values of the obtained non-player characters; and generate the multiplayer video game with the obtained non-player characters.

4. The computer-implemented method of claim 1, wherein the player profile of each of the identified one or more human players comprises a first set of profile attributes and wherein the non-player character player profile of each of the one or more non-player characters comprises a second set of profile attributes.

5. The computer-implemented method of claim 4, further comprising:

determining, by the computer system, a subset of profile attributes common to the first set of profile attributes and the second set of profile attributes; and enabling, by the computer system, a display of only the determined subset of profile attributes when any of the player profiles of the identified one or more human players or any of the non-player character player profiles of the obtained one or more non-player characters are accessed.

6. The computer-implemented method of claim 1, wherein the value that is a function of the skill level values of the identified one or more human players is an average of the skill level values of the identified one or more human players.

7. The computer-implemented method of claim 1, wherein the value indicative of the skill level of a player is determined using historical performance data of the player.

8. The computer-implemented method of claim 1, wherein the value indicative of the skill level of a player is determined using profile attributes of the player, wherein the profile attributes comprise at least one of a number of games played, a winning percentage, a highest score, or a lowest score.

9. The computer-implemented method of claim 1 wherein the value indicative of the skill level of a player varies based on a type of the multiplayer video game being played.

10. The system of claim 2, wherein the player profile of each of the identified one or more human players comprises a first set of profile attributes and wherein the non-player character player profile of each of the one or more non-player characters comprises a second set of profile attributes.

11. The system of claim 10, wherein, when executed, the program instructions cause the computer to:

determine a subset of profile attributes common to the first set of profile attributes and the second set of profile attributes; and enable a display of only the determined subset of profile attributes when any of the player profiles of the identified one or more human players or any of the non-player character player profiles of the obtained one or more non-player characters are accessed.

12. The system of claim 2, wherein the value that is a function of the skill level values of the identified one or more human players is an average of the skill level values of the identified one or more human players.

13. The system of claim 2, wherein the value indicative of the skill level of a player is determined using historical performance data of the player.

14. The system of claim 2, wherein the value indicative of the skill level of a player is determined using profile attributes of the player, wherein the profile attributes comprise at least one of a number of games played, a winning percentage, a highest score, or a lowest score.

15. The system of claim 2, wherein the value indicative of the skill level of a player varies based on a type of the multiplayer video game being played.

16. The computer program product of claim 3, wherein the player profile of each of the identified one or more human players comprises a first set of profile attributes and wherein the non-player character player profile of each of the one or more non-player characters comprises a second set of profile attributes.

17. The computer program product of claim 16, wherein, when executed, the program instructions cause the computer to:
determine a subset of profile attributes common to the first set of profile attributes and the second set of profile attributes; and
enable a display of only the determined subset of profile attributes when any of the player profiles of the identified one or more human players or any of the non-player character player profiles of the obtained one or more non-player characters are accessed.

18. The computer program product of claim 3, wherein the value that is a function of the skill level values of the identified one or more human players is an average of the skill level values of the identified one or more human players.

19. The computer program product of claim 3, wherein the value indicative of the skill level of a player is determined using historical performance data of the player.

20. The computer program product of claim 3, wherein the value indicative of the skill level of a player is determined using profile attributes of the player, wherein the profile attributes comprise at least one of a number of games played, a winning percentage, a highest score, or a lowest score.

21. The computer program product of claim 3, wherein the value indicative of the skill level of a player varies based on a type of the multiplayer video game being played.

* * * * *